(12) United States Patent
Shiba et al.

(10) Patent No.: US 12,246,930 B2
(45) Date of Patent: Mar. 11, 2025

(54) HOLDING DEVICE, TRANSPORTING DEVICE, AND METHOD FOR CONTROLLING HOLDING DEVICE

(71) Applicant: Kabushiki Kaisha Toshiba, Tokyo (JP)

(72) Inventors: Taketo Shiba, Yokohama (JP); Kazuma Hiraguri, Yokohama (JP); Noriyuki Ooba, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 557 days.

(21) Appl. No.: 17/647,488

(22) Filed: Jan. 10, 2022

(65) Prior Publication Data

US 2022/0219915 A1    Jul. 14, 2022

(30) Foreign Application Priority Data

Jan. 14, 2021  (JP) ................. 2021-004554

(51) Int. Cl.
*B65G 47/90*   (2006.01)
(52) U.S. Cl.
CPC ................. *B65G 47/905* (2013.01)
(58) Field of Classification Search
CPC .................................................. B65G 47/905
See application file for complete search history.

(56) References Cited

U.S. PATENT DOCUMENTS

| 10,556,338 | B1 | 2/2020 | Marchese et al. |
| 2014/0163737 | A1* | 6/2014 | Nagata ............. B25J 9/1697 700/259 |
| 2017/0313512 | A1* | 11/2017 | Miyagawa ......... B65G 1/065 |

FOREIGN PATENT DOCUMENTS

| JP | 60-190592 U | 12/1985 |
| JP | 6-226671 A | 8/1994 |
| JP | 2010162638 A | * 7/2010 |
| JP | 2010-214510 A | 9/2010 |

(Continued)

OTHER PUBLICATIONS

Japanese Office Action issued Apr. 23, 2024 in Japanese Application 2021-004554, (with unedited computer-generated English translation), 8 pages.

*Primary Examiner* — Saul Rodriguez
*Assistant Examiner* — Brendan P Tighe
(74) *Attorney, Agent, or Firm* — Oblon, McClelland, Maier & Neustadt, L.L.P.

(57) ABSTRACT

According to one embodiment, a holding device includes: holding parts; a holding part opening/closing part that opens and closes the holding parts; a first sensor that detects a load received by the holding part; and a controller that controls an operation of the holding part. At least one of the plurality of holding parts includes a claw member displaceable along a length direction of the holding part, a second sensor that detects a displacement amount of the claw member, and a reaction force applying part that applies a reaction force corresponding to the displacement amount of the claw member to the claw member. The controller controls the operation of the holding part, based on a detection value of the second sensor when the displacement amount is equal to or less than a threshold value, and based on a detection value of the first sensor when the displacement amount exceeds the threshold value.

20 Claims, 7 Drawing Sheets

(56) References Cited

FOREIGN PATENT DOCUMENTS

| | | |
|---|---|---|
| JP | 2011-56595 A | 3/2011 |
| JP | 5346511 B2 | 11/2013 |
| WO | WO 2013/027251 A1 | 2/2013 |
| WO | WO-2018029268 A1 * | 2/2018 ........... B65G 1/1373 |

* cited by examiner

HOLDING DEVICE, TRANSPORTING DEVICE, AND METHOD FOR CONTROLLING HOLDING DEVICE

CROSS-REFERENCE TO RELATED APPLICATION

This application is based upon and claims the benefit of priority from Japanese Patent Application No. 2021-004554, filed Jan. 14, 2021; the entire contents of (all of) which are incorporated herein by reference.

FIELD

Embodiments described herein relate generally to a holding device, a transporting device, and a method for controlling a holding device.

BACKGROUND

A picking robot equipped with a robot hand having a holding unit has been conventionally known. This type of holding unit holds an object by a plurality of holding claws. The holding unit includes a sensor that detects that the holding claw has come into contact with the object, and controls the operation of the robot hand based on the detection value of the sensor.

DETAILED DESCRIPTION

According to one embodiment, a holding device includes: a plurality of holding parts configured to hold an object to be held; a holding part opening/closing part configured to open and close the plurality of holding parts; a first sensor configured to detect a load received by the holding part; and a controller configured to control an operation of the holding part. At least one of the plurality of holding parts includes a claw member configured to be displaceable along a length direction of the holding part, a second sensor configured to detect a displacement amount of the claw member, and a reaction force applying part configured to apply a reaction force corresponding to the displacement amount of the claw member to the claw member. The controller controls the operation of the holding part, based on a detection value of the second sensor when the displacement amount is equal to or less than a threshold value, and based on a detection value of the first sensor when the displacement amount exceeds the threshold value.

Hereinafter, the method for controlling the holding device, the transporting device, and the holding device of the embodiment will be described with reference to the drawings.

The XYZ Cartesian coordinate system is used for the description of the holding device and the transporting device of the embodiment. The Z-axis direction corresponds to the vertical direction, the +Z direction is defined as upward, and the −Z direction is defined as downward. The X-axis direction and the Y-axis direction are orthogonal to each other in the horizontal plane. The direction in which a holding claw 29 (holding part) of a holding unit 21, which will be described later, opens and closes in the horizontal plane is defined as the X-axis direction. In the horizontal plane, the direction orthogonal to the opening/closing direction of the holding claw 29 is defined as the Y-axis direction.

Figure 1:
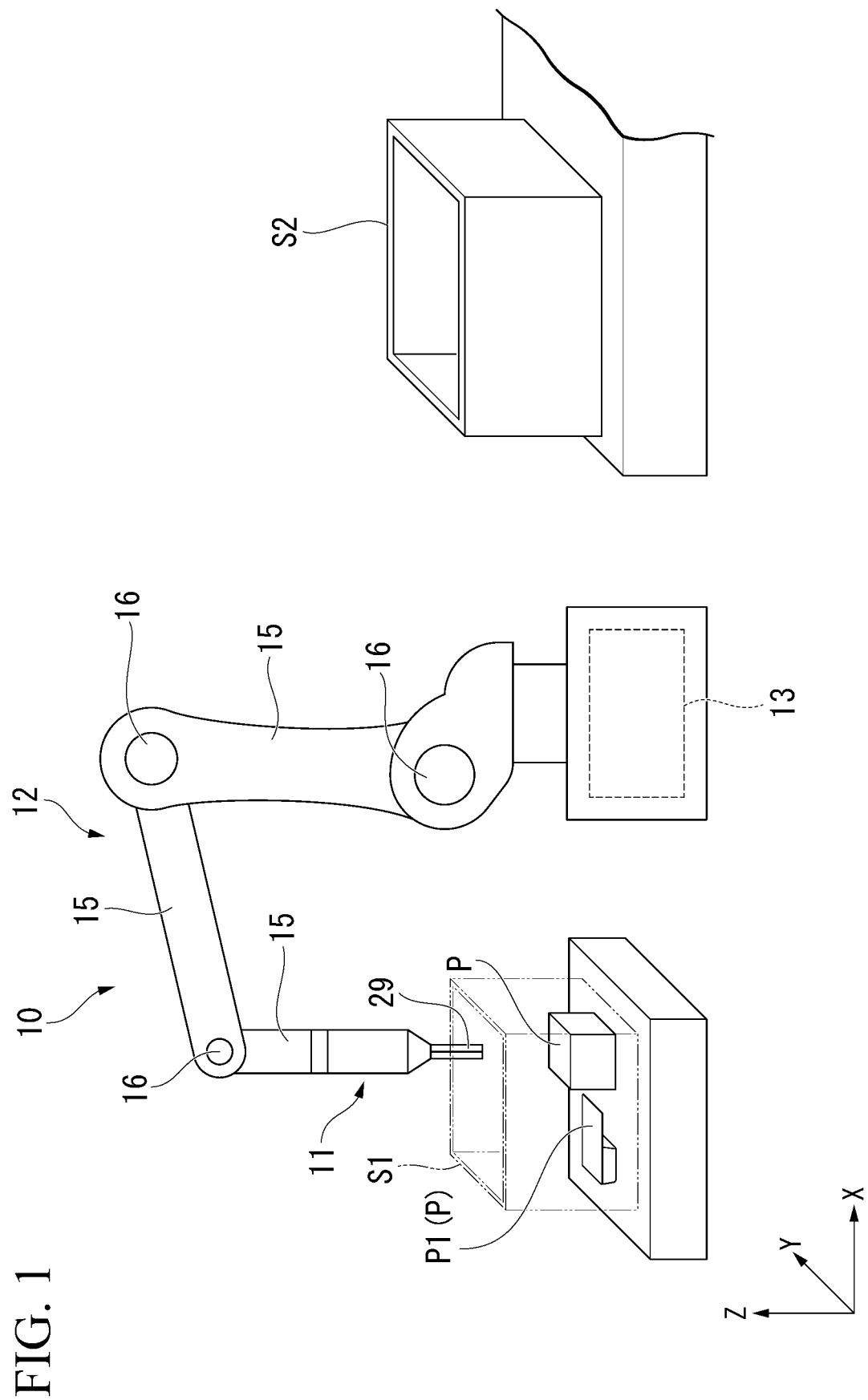
FIG. 1 is a schematic diagram of a picking robot according to an embodiment.

FIG. 1 is a schematic diagram showing a schematic configuration of a picking robot 10 of the present embodiment.

As shown in FIG. 1, the picking robot 10 includes a robot hand 11, an arm 12, and a controller 13. The robot hand 11 holds the holding object P that is a transporting target. The arm 12 moves the robot hand 11 to a predetermined place. The controller 13 controls each part of the robot hand 11 and the arm 12. The configuration of the robot hand 11 will be described in detail later.

The picking robot 10 of the present embodiment corresponds to a transporting device within the scope of claims. The robot hand 11 of the present embodiment corresponds to a holding device within the scope of claims.

The outline of the configuration and operation of the picking robot 10 will be described below.

The picking robot 10 is used, for example, as a picking robot for physical distribution. The picking robot 10 holds various holding objects P placed in various situations in the transport source S1 and moves them to the transport destination S2. The use of the picking robot 10 is not limited to logistics, but can be widely applied to industrial use, other uses, and the like. The picking robot 10 of the present embodiment is not limited to a device whose main purpose is to transport the holding object P, but also includes a device that transports or moves an object as a part of other purposes such as assembling a product.

The transport source S1 is, for example, various conveyors, pallets, containers, or the like, but is not limited thereto. A plurality of types of holding objects P having different dimensions and weights are placed at random positions in an arbitrary orientation on the transport source S1. In the present embodiment, the dimensions of the holding object P to be transported vary from, for example, about several cm square to about several tens of cm square. The weight of the holding object P varies from, for example, about several tens of g to about several kg. The dimensions and weight of the holding object P are not limited to the above example.

The transport destination S2 is, for example, various conveyors, pallets, containers, or the like, as in the transport source S1, but is not limited thereto. The container of the transport source S1 and the transport destination S2 broadly means a member capable of accommodating the holding object P, for example, a box-shaped member.

The arm 12 is composed of, for example, 6-axis vertical articulated arm. The arm 12 includes a plurality of arm members 15 and a plurality of joint portions 16. The joint portion 16 rotatably connects the arm members 15 connected to the joint portion 16. The arm 12 may be composed of, for example, 4-axis vertical articulated arm or 3-axis orthogonal arm. The arm 12 may be a mechanism for moving the robot hand 11 to a desired position by a configuration other than the vertical articulated arm and the orthogonal arm. Although not shown, the arm 12 includes a sensor or the like for detecting the angle formed by the arm member 15 in each joint portion 16.

Although not shown, the picking robot 10 further includes sensors installed in the vicinity of the transport source S1 and the transport destination S2. The sensor is composed of, for example, an RGB-D sensor, a camera, a contact sensor, a distance sensor and the like. The sensor acquires, for example, information about the holding object P placed in the transport source S1, information about the status of the transport source S1 or the transport destination S2, and the like.

The controller 13 manages and controls each part of the picking robot 10. The controller 13 acquires various information detected by the sensor, and controls the position and operation of the robot hand 11 based on the acquired information. The controller 13 is composed of a microcomputer including a processor such as a CPU (Central Processing Unit). The controller 13 is realized by a processor such as a CPU executing a program stored in a memory or an auxiliary storage device. At least a part of the controller 13 may be realized by hardware such as LSI (Large Scale Integration), ASIC (Application Specific Integrated Circuit), FPGA (Field-Programmable Gate Array), or may be realized by cooperation between software and hardware.

Hereinafter, the robot hand 11 will be described.

Figure 2:
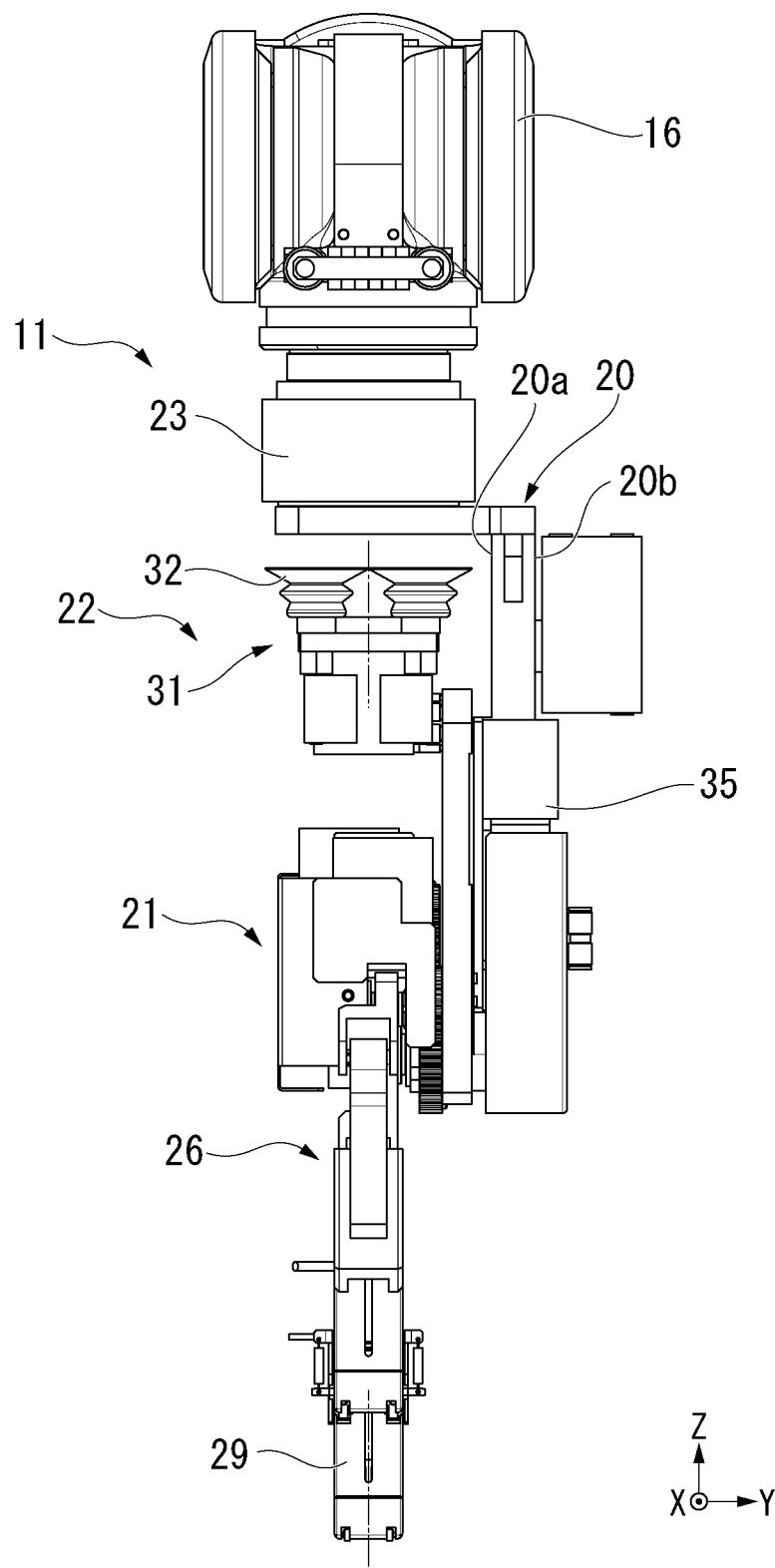
FIG. 2 is a side view of a robot hand of the embodiment.
Figure 3:
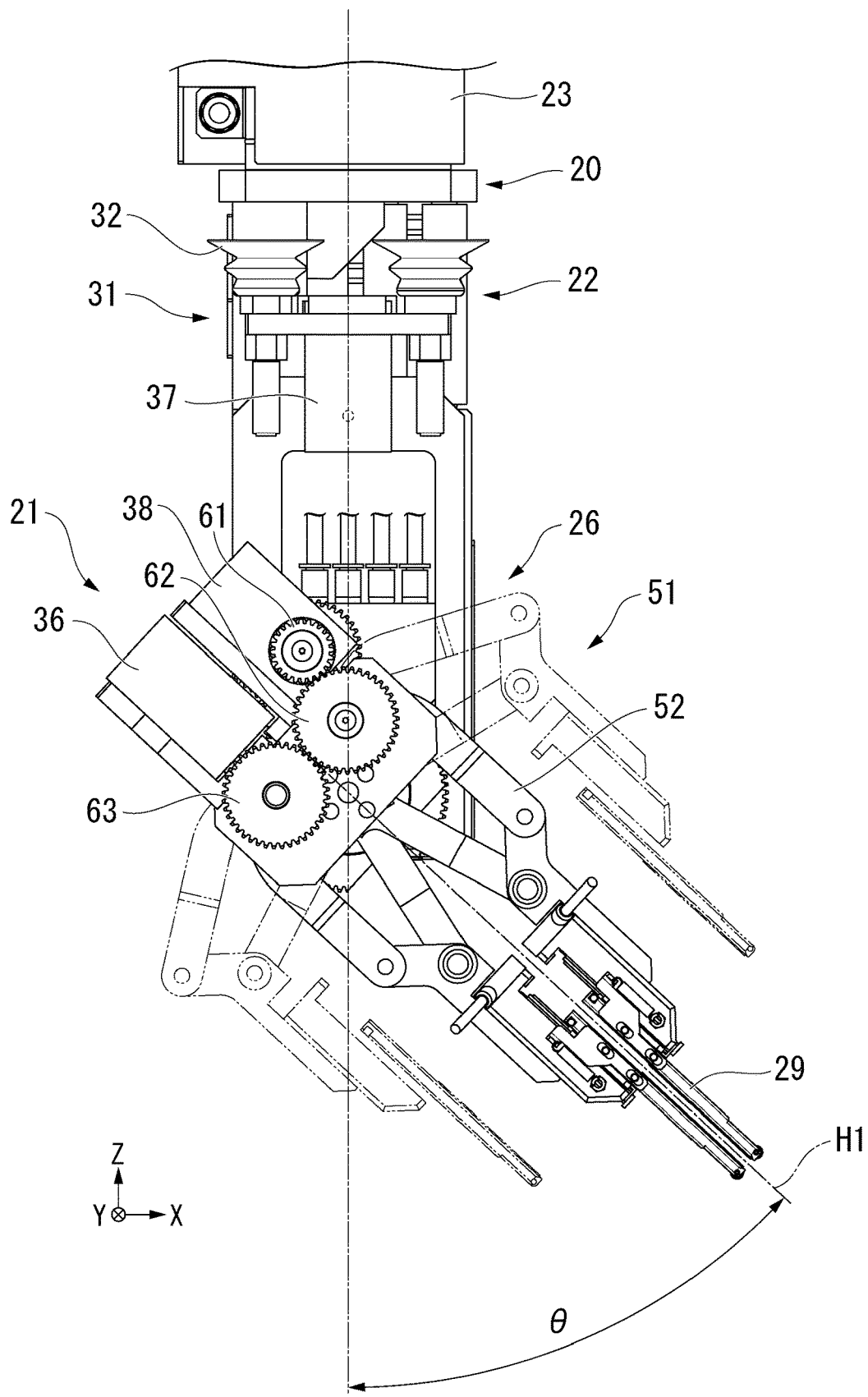
FIG. 3 is a front view of the robot hand of the embodiment.

FIG. 2 is a side view of the robot hand 11 as seen from the +X direction. FIG. 3 is a front view of the robot hand 11 as seen from the −Y direction. In the present specification, a view of each device viewed from the +X direction is referred to as a side view, and a view of each device viewed from the −Y direction is referred to as a front view.

As shown in FIG. 2, the robot hand 11 includes a base plate 20, a holding unit 21, a suction unit 22, and a force sensor 23.

The base plate 20 is a plate-shaped member and has a first surface 20*a* and a second surface 20*b* facing each other. The base plate 20 supports the holding unit 21 and the suction unit 22. The holding unit 21 and the suction unit 22 face the first surface 20*a* of the base plate 20 and are arranged side by side in the Y-axis direction. The base plate 20 is arranged only on one side of the holding unit 21 and the suction unit 22, and is not arranged on the other side. That is, the holding unit 21 and the suction unit 22 are not sandwiched from both sides by the base plate 20, but are supported by the cantilever structure with respect to the base plate 20.

The suction unit 22 is arranged so as to face the first surface 20*a* of the base plate 20. The holding unit 21 is arranged on the side opposite to the side where the base plate 20 is located with respect to the suction unit 22. That is, these two units 21 and 22 are arranged in the order of the suction unit 22 and the holding unit 21 from the first surface 20*a* side of the base plate 20. A part of the base plate 20, a part of the suction unit 22, and a part of the holding unit 21 are arranged at positions where they overlap each other when viewed from the normal direction (Y-axis direction) of the first surface 20*a*.

The suction unit 22 has a plurality of suction pads 32. The suction unit 22 uses a plurality of suction pads 32 to hold the holding object P in a form of negative pressure suction. The suction unit 22 is rotatably supported in a plane parallel to the first plane 20*a* (in the XZ plane) with respect to the base plate 20.

The holding unit 21 has a plurality of holding claws 29 (holding parts). The holding unit 21 holds the holding object P from the side by using a plurality of holding claws 29. The holding unit 21 is rotatably supported in a plane parallel to the first plane 20*a* (in the XZ plane) with respect to the base plate 20.

The force sensor 23 is arranged on the upper part of the base plate 20. The force sensor 23 detects the load received by the holding claw 29 when the holding claw 29 comes into contact with an arbitrary object such as a floor surface, a wall surface, another obstacle, or a holding object P. The detected value of the force sensor 23 is output to the controller 13 and used for controlling various operations of the holding unit 21.

The force sensor 23 of the present embodiment corresponds to the first sensor in the claims.

The robot hand 11 has a function of switching which of the holding unit 21 and the suction unit 22 to be used for holding the holding object P according to the holding object P, a function of changing the orientation of the holding unit 21, a function of changing the orientation of the suction unit 31 including a plurality of suction pads 32, and a function of opening and closing the holding claw 29. In order to realize these functions, the robot hand 11 includes a first motor 35, a second motor 36, a third motor 37, and a fourth motor 38.

The rotation of the first motor 35 is transmitted to the holding unit 21 via a rotation transmission mechanism (not shown). The holding unit 21 is rotated by the first motor 35. As shown in FIG. 3, the holding unit 21 can change its orientation so that the holding center line H1 faces, for example, in a counterclockwise direction at an angle −θ when the orientation in which the holding center line H1 faces downward in the vertical direction is set to 0°. Contrary to FIG. 3, the holding unit 21 can change its orientation so that the holding center line H1 faces the direction in which the angle+θ is formed clockwise. In this way, the orientations of the plurality of holding claws 29 can be changed. The holding center line H1 is defined as a straight line parallel to the Z axis at the initial position (position before the orientation change) of the holding unit 21, and a straight line passing through the center of the two holding claws 29 in the opening/closing direction (X-axis direction) and the center of one holding claw 29 in the width direction (Y-axis direction).

When switching the units 21 and 22, the holding unit 21 and the suction unit 22 are integrally rotated by the first motor 35. On the other hand, when changing the orientation of the holding unit 21, due to the rotation of the second motor 36 together with the rotation of the first motor 35, the suction unit 22 rotates in a direction that cancels the change in the orientation of the suction unit 22 due to the change in the orientation of the holding unit 21. As a result, as shown in FIG. 3, even if the orientation of the holding unit 21 changes, the orientation of the suction unit 22 does not change while facing upward in the vertical direction.

The rotation of the third motor 37 is transmitted to the suction unit 31 including the plurality of suction pads 32 via the rotation transmission mechanism (not shown). As a result, the suction unit 31 rotates with the rotation of the third motor 37, and the orientation is changed.

As shown in FIG. 3, the holding unit 21 includes a plurality of holding claws 29 and a holding claw opening/closing part 26 (holding part opening/closing part). The holding claw opening/closing part 26 includes a link portion 51, a first gear 61, a second gear 62, and a third gear 63.

The holding unit 21 of the present embodiment includes two holding claws 29 connected to the link portion 51. The number of the holding claws 29 may be 3 or more, and is not particularly limited.

The link portion 51 is composed of two parallel links 52. Each of the two holding claws 29 is connected to each of the two parallel links 52. The two holding claws 29 move in a direction in which the two holding claws 29 are spaced apart from each other while rising in the height direction of the holding unit 21 due to the movement of the link portion 51, and open and close by moving in a direction in which the distance between the two holding claws 29 is narrowed while descending in the height direction of the holding unit 21.

The first gear 61 is connected to the fourth motor 38. The second gear 62 meshes with the first gear 61. The third gear 63 meshes with the second gear 62. When the first gear 61 is rotated by the drive of the fourth motor 38, the second gear 62 and the third gear 63 rotate in opposite directions in the XZ plane, and the two parallel links 52 move. The two holding claws 29 perform either an open operation or a closed operation depending on which direction the second gear 62 and the third gear 63 rotate. Hereinafter, the configuration of the holding claw 29 will be described.

Figure 4:
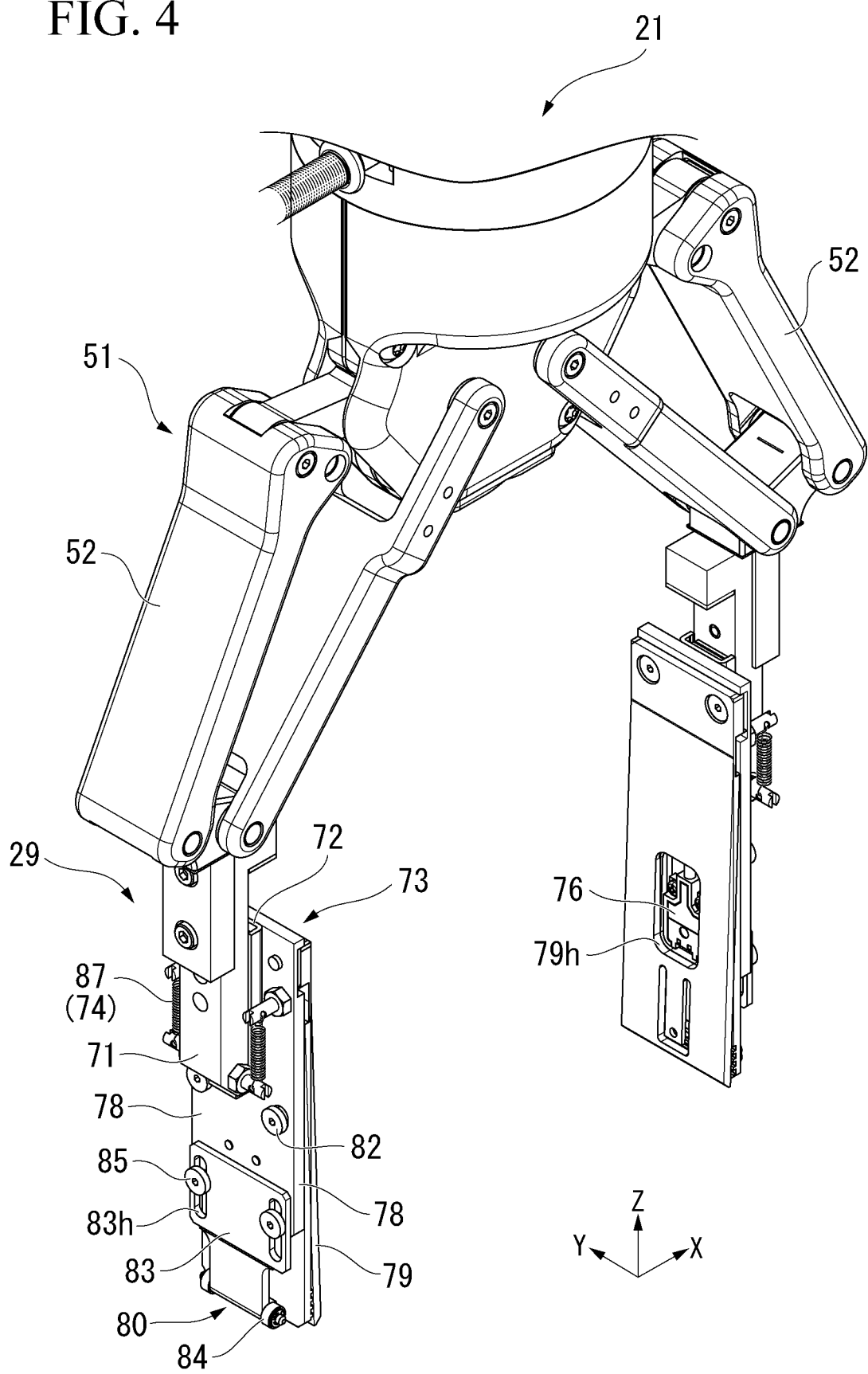
FIG. 4 is a perspective view of a main part of a holding unit.
Figure 5:
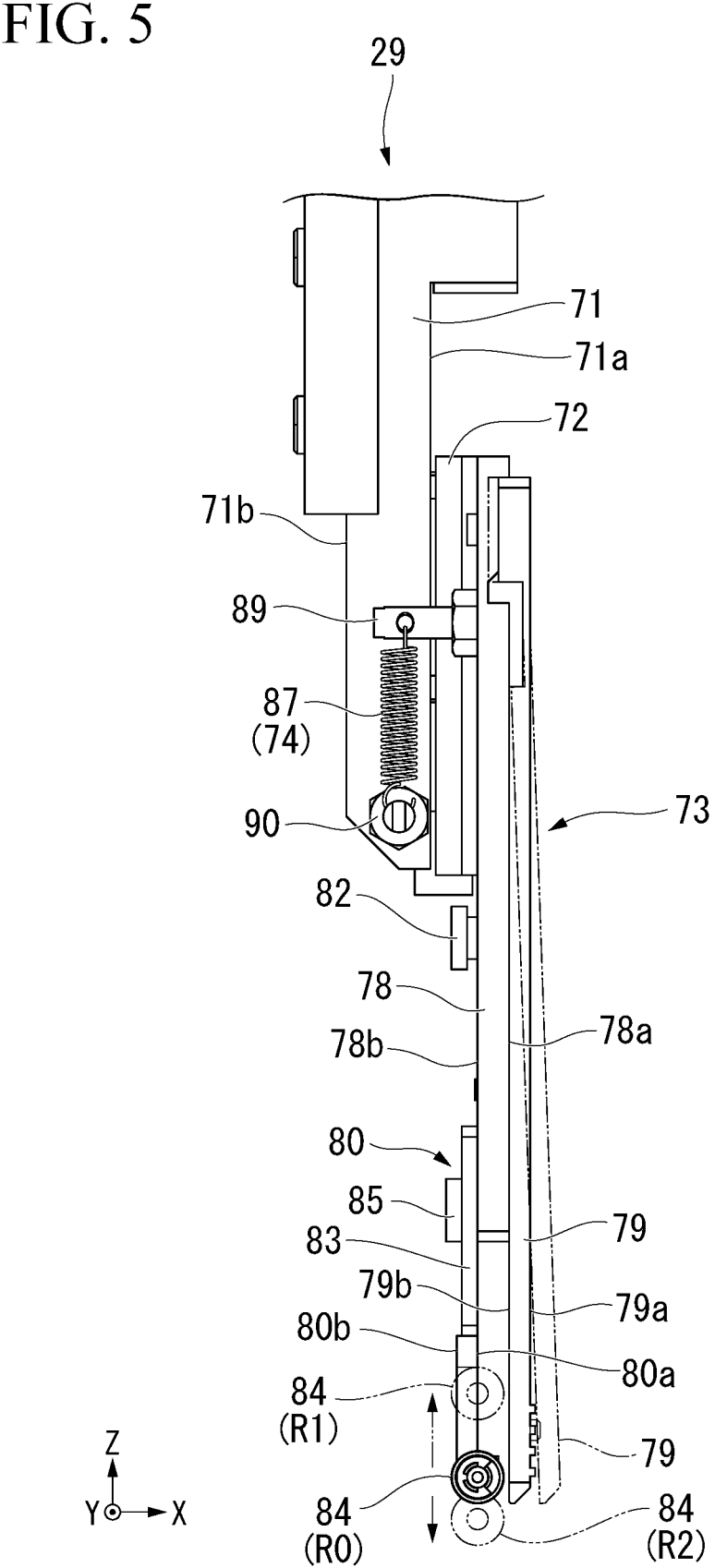
FIG. 5 is a front view of a holding claw.
Figure 6:
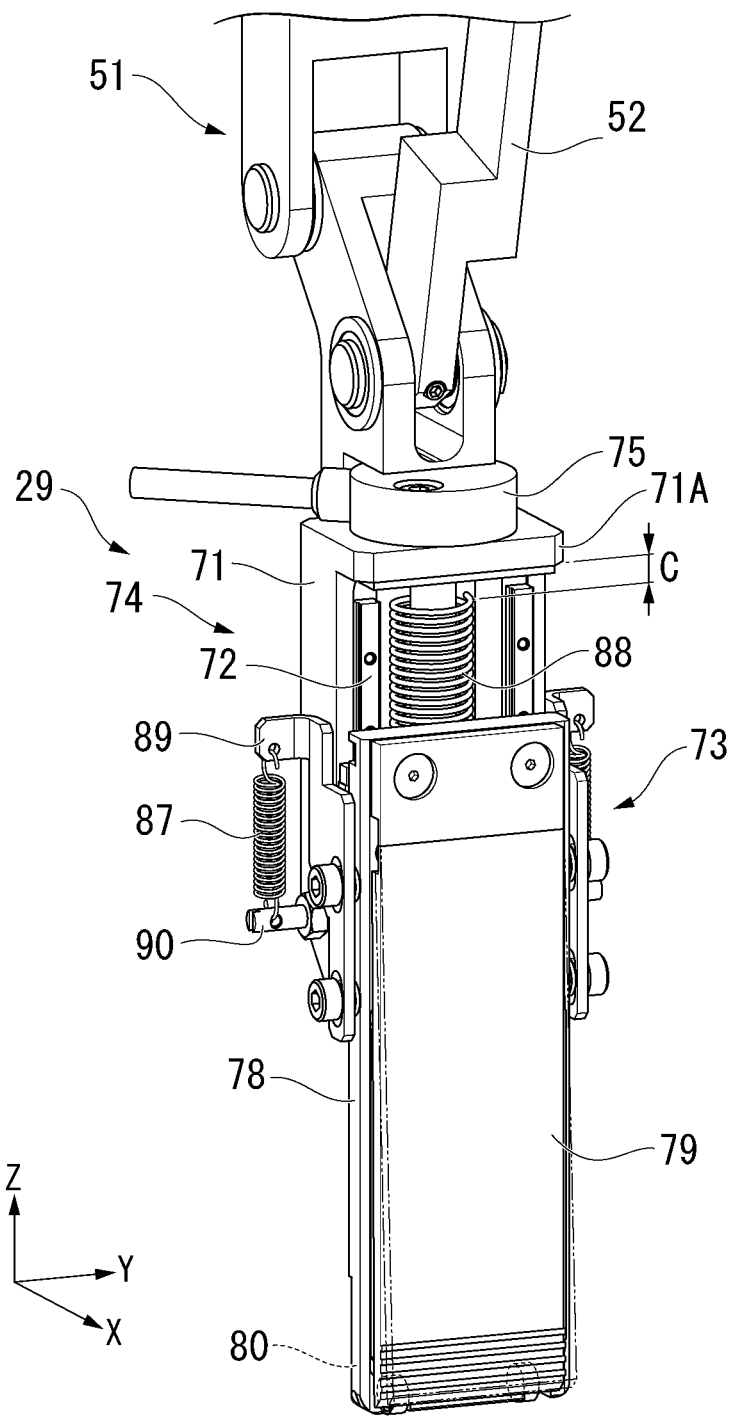
FIG. 6 is a perspective view showing an internal configuration of the holding claw.

FIG. 4 is a perspective view showing a main part of the holding unit 21. FIG. 5 is a front view of the holding claw 29. FIG. 6 is a perspective view showing the internal configuration of the holding claw 29. In FIG. 6, in order to make it easier to see the internal configuration of the holding claw 29, the illustration of the member surrounding the outside is omitted as appropriate.

As shown in FIG. 4, the two holding claws 29 have the same configuration as each other. The two holding claws 29 are arranged so that the first surfaces 79a of the inner claws 79, which will be described later, face each other.

As shown in FIGS. 4, 5 and 6, the holding claw 29 includes a base member 71, a linear guide 72, a claw member 73, a reaction force applying part 74, a displacement sensor 75, and a transmission sensor 76.

The displacement sensor 75 of this embodiment corresponds to the second sensor in the claims.

As shown in FIG. 5, the base member 71 is composed of a plate-shaped member. The base member 71 has a first surface 71a and a second surface 71b opposite to the first surface 71a. The upper end of the base member 71 is connected to the parallel link 52. The first surface 71a of the base member 71 is provided with a linear guide 72 extending along the length direction (Z-axis direction) of the base member 71.

The claw member 73 includes a slide base 78, an inner claw 79, and an outer claw 80. The claw member 73 is arranged so as to face the first surface 71a of the base member 71. The claw member 73 is connected to the base member 71 via a linear guide 72. The claw member 73 can be displaced in the length direction (Z-axis direction) of the holding claw 29 by moving in parallel along the linear guide 72. In other words, the holding claw 29 can be expanded and contracted by the claw member 73 moving in parallel along the linear guide 72.

The slide base 78 is composed of a plate-shaped member. The slide base 78 has a first surface 78a and a second surface 78b opposite to the first surface 78a. An inner claw 79 is connected to the upper portion of the first surface 78a of the slide base 78. An outer claw 80 is connected to the lower portion of the second surface 78b of the slide base 78. The slide base 78 is connected to the base member 71 via a linear guide 72.

The inner claw 79 is arranged inside the holding claw 29 in the opening/closing direction (X-axis direction) (the side on which the holding object P is located) in the claw member. The inner claw 79 has a first surface 79a and a second surface 79b opposite to the first surface 79a. The inner claw 79 holds the holding object P in a state where the first surface 79a is in contact with the holding object P. The inner claw 79 is composed of a leaf spring. The leaf spring is elastically deformable in the opening/closing direction (X-axis direction) of the holding claw 29. The lower end of the inner claw 79 is located below the lower end of the slide base 78.

As shown by the two-dot chain line in FIG. 5, in the initial state, the inner claw 79 is warped in the direction in which the tip of the inner claw 79 faces inward in the opening/closing direction. Therefore, in the initial state, the lower portion of the second surface 79b of the inner claw 79 is located at a position away from the first surface 78a of the slide base 78. The initial state referred to here means a state in which the holding claw 29 does not hold the holding object P. As shown by the solid line in FIG. 5, in the state where the holding claw 29 holds the holding object P, the inner claw 79 is elastically deformed in a direction in which the tip opens outward in the opening/closing direction, and the second surface 79b comes into contact with the first surface 78a of the slide base 78.

A stopper 82 is provided on the second surface 79b of the inner claw 79. The stopper 82 has a pin-like shape. The stopper 82 penetrates the hole provided in the slide base 78, and its head faces the second surface 78b of the slide base 78. In FIG. 5, which shows a state in which the holding object P is held, there is a gap between the head of the stopper 82 and the slide base 78. On the other hand, in the initial state in which the holding object P is not held, the head of the stopper 82 comes into contact with the slide base 78. The inner claw 79 is prevented from warping more than necessary toward the inside in the opening/closing direction by the stopper 82 coming into contact with the slide base 78 in the initial state.

The outer claw 80 is arranged on the outside of the holding claw 29 in the opening/closing direction (X-axis direction) (the side opposite to the side on which the holding object P is located) in the claw member 73. The outer claw 80 has a first surface 80a and a second surface 80b opposite to the first surface 80a. The outer claw 80 includes a support plate 83 and two rollers 84. The lower end of the outer claw 80 is located below the lower end of the slide base 78.

The roller 84 of the present embodiment corresponds to the friction reducing member in the claims.

As shown in FIG. 4, an elongated hole 83h extending in the length direction (Z-axis direction) of the holding claw 29 is provided on the upper portion of the support plate 83. The support plate 83 is supported by the slide base 78 via a screw 85 inserted through the elongated hole 83h. With this configuration, the outer claw 80 is displaceably connected to the inner claw 79 in the length direction of the holding claw 29. As shown in FIG. 5, the position where the position of the lower end of the outer claw 80 (the outer peripheral surface of the roller 84) coincides with the position of the lower end of the inner claw 79 in the length direction of the holding claw 29 is the reference position R0 of the outer claw 80. The lower end of the outer claw 80 can be displaced to the upper position R1 and also to the lower position R2 with respect to the reference position R0. The amount of upward displacement and the amount of downward displacement of the outer claw 80 with respect to the reference position R0 can be appropriately adjusted.

The roller 84 is provided at the lower end of the support plate 83. The roller 84 is rotatable about a rotation axis along the Y-axis direction. The roller 84 reduces the friction between the holding claw 29 and the object when the holding claw 29 comes into contact with an arbitrary object such as a floor surface. In the present embodiment, two rollers 84 are provided at intervals in the width direction (Y-axis direction) of the support plate 83. Instead of this configuration, one roller having a wide width in the Y-axis direction may be provided, and the number of rollers is not particularly limited. Further, instead of the configuration in which the roller 84 is provided at the lower end of the support plate 83, for example, another member that has been subjected to friction reduction processing may be provided.

As shown in FIG. 4, the transmission sensor 76 is provided on the first surface 78a of the slide base 78. The transmission sensor 76 installed on one holding claw 29 faces the transmission sensor 76 provided on the other holding claw 29 via the opening 79h provided on the inner claw 79. The transmission sensor 76 detects the presence or absence of an object located between the two holding claws 29 by detecting the transmission or blocking of light such as visible light and infrared light.

As shown in FIG. 6, the reaction force applying part 74 includes a tension spring 87 and a compression spring 88. The reaction force applying part 74 applies a reaction force to the claw member 73 to return the claw member 73 to the initial position when the claw member 73 is displaced from the initial position. That is, the reaction force applying part 74 applies a reaction force to the claw member 73 according to the amount of displacement of the claw member 73.

The tension spring 87 of the present embodiment corresponds to the first reaction force applying member within the scope of claims. The compression spring 88 of the present embodiment corresponds to the second reaction force applying member within the scope of claims.

As shown in FIGS. 5 and 6, a first spring fixing portion 89 is provided on the upper portion of the slide base 78. A second spring fixing portion 90 is provided at the lower portion of the base member 71. The tension spring 87 is arranged between the first spring fixing portion 89 and the second spring fixing portion 90. The upper end of the tension spring 87 is connected to the first spring fixing portion 89. The lower end of the tension spring 87 is connected to the second spring fixing portion 90. The tension springs 87 are provided on both sides of the base member 71 in the Y-axis direction.

According to this configuration, when the claw member 73 comes into contact with, for example, the floor surface and is displaced upward from the initial position, the tension spring 87 is extended. At this time, a reaction force in the direction in which the tension spring 87 contracts is generated, and the tension spring 87 applies a reaction force to the claw member 73 to move the claw member 73 downward and return it to the initial position.

As shown in FIG. 6, the compression spring 88 is arranged between the base member 71 and the claw member 73. The lower end of the compression spring 88 is supported by the slide base 78 of the claw member 73. The upper end of the compression spring 88 is not in contact with the base member 71 in the initial state, and a gap C is provided between the compression spring 88 and the top plate portion 71A of the base member 71. The gap C is 5 mm as an example, but is not particularly limited and can be appropriately adjusted.

The gap C of the present embodiment corresponds to the threshold value of the displacement amount of the claw member in the claims.

According to this configuration, when the claw member 73 comes into contact with the floor surface and is displaced upward from the initial position, for example, the tension spring 87 acts until the displacement amount of the claw member 73 reaches 5 mm, while the tension spring 87 acts. Since the compression spring 88 does not come into contact with the base member 71, no action is generated. Next, when the displacement amount of the claw member 73 reaches 5 mm, the compression spring 88 comes into contact with the base member 71 and the compression spring 88 starts to act. When the displacement amount of the claw member 73 exceeds 5 mm, a reaction force in the direction in which the compression spring 88 extends from the contracted state acts. In this way, the compression spring 88 applies a reaction force to the claw member 73 to move the claw member 73 downward and return it to the initial position.

The spring constant of the compression spring 88 is larger than the spring constant of the tension spring 87. Specifically, for example, the wire rod constituting the compression spring 88 is thicker than the wire rod constituting the tension spring 87. Therefore, the reaction force applied to the claw member 73 by the compression spring 88 is larger than the reaction force applied to the claw member 73 by the tension spring 87. As described above, in the reaction force applying part 74, the tension spring 87 that applies the first reaction force to the claw member 73 when the displacement amount of the claw member 73 is 5 mm or less, and the displacement amount of the claw member 73 exceeds 5 mm. In some cases, the claw member 73 is provided with the compression spring 88 that applies a second reaction force larger than the first reaction force.

Figure 7:
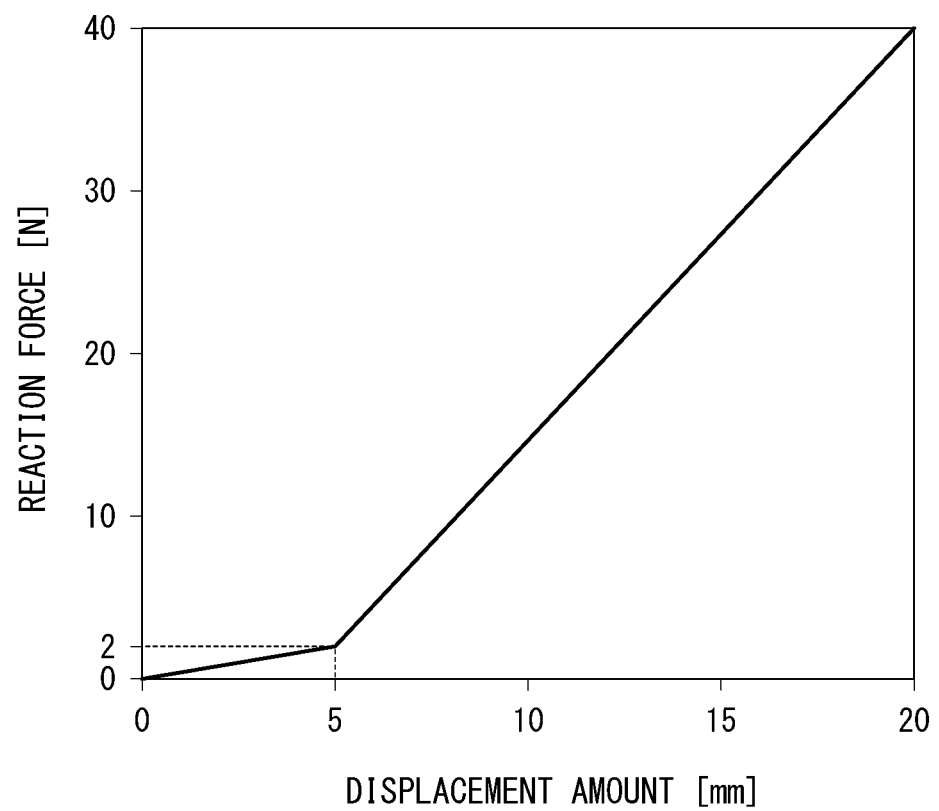
FIG. 7 is a diagram showing a relationship between a displacement amount of a claw member and a reaction force.

FIG. 7 is a diagram showing an example of the relationship between the displacement amount of the claw member 73 and the reaction force. In FIG. 7, the horizontal axis is the displacement amount (mm), and the vertical axis is the reaction force (N).

As described above, when the displacement amount of the claw member 73 is 5 mm or less, the tension spring 87 generates a reaction force, and when the displacement amount of the claw member 73 exceeds 5 mm, the compression spring 88 generates a reaction force. Further, the reaction force due to the compression spring 88 is larger than the reaction force due to the tension spring 87.

Therefore, as shown in FIG. 7, in the range of the displacement amount of 0 to 5 mm, the reaction force linearly increases as the displacement amount increases. When the displacement amount is 5 mm, the reaction force is, for example, 2N. Further, even when the displacement amount is in the range of 5 to 20 mm, the reaction force linearly increases as the displacement amount increases. However, the slope of the straight line in the range of the displacement amount of 5 to 20 mm is larger than the slope of the straight line in the range of the displacement amount of 0 to 5 mm. When the displacement amount is 20 mm, the reaction force is, for example, 40 N. It should be noted that these numerical values are examples and are not particularly limited. The numerical value of the reaction force corresponding to the displacement amount in FIG. 7 is determined according to the thickness of the spring (spring constant). Therefore, the threshold value of the displacement amount can be appropriately changed by changing the combination of the thickness (spring constant) of the spring.

As shown in FIG. 6, the displacement sensor 75 is arranged above the base member 71. The displacement sensor 75 detects the amount of displacement of the claw member 73 when the holding claw 29 comes into contact with an arbitrary object and the claw member 73 is displaced. As a mechanism for the displacement sensor 75 to detect the amount of displacement of the claw member 73, the claw member 73 contacts on an object and escapes (displaces), so that the distance between the claw member 73 and the displacement sensor 75 changes. The sensor 75 detects the displacement amount of the claw member 73 by the change amount of this distance. The detected value of the displacement sensor 75 is output to the controller 13 and used to control the operation of the holding claw 29. As the displacement sensor 75, various displacement sensors such as a laser displacement sensor, a magnetic displacement sensor, and a capacitance type displacement sensor are used.

The controller 13 receives the detection signal from the displacement sensor 75 and determines which of the detection values of the displacement sensor 75 and the force sensor 23 is used to control the operation of the holding claw 29. When the displacement amount of the claw member 73 is 5 mm or less, which is the threshold value, the controller 13 controls the operation of the holding claw 29 based on the detection value of the displacement sensor 75. When the displacement amount of the claw member 73 exceeds the threshold value of 5 mm, the controller 13 controls the operation of the holding claw 29 based on the detection value of the force sensor 23.

That is, the method for controlling the robot hand 11 of the present embodiment controls the operation of the holding claw 29 based on the detection value of the displacement sensor 75 when the displacement amount of the tip of the holding claw 29 is equal to or less than the threshold value, and the holding claw 29 is controlled. When the displacement amount of the tip of the tip exceeds the threshold value, the operation of the holding claw 29 is controlled based on the detected value of the force sensor 23.

Hereinafter, the effects of the robot hand 11 and the picking robot 10 of the present embodiment will be described.

In this type of robot hand, a force sensor is widely used for the purpose of detecting the contact state of the holding claw with an object or an obstacle. A general force sensor detects the strain generated in the structure provided in the sensor when a load is applied by various methods. On the other hand, there is a demand for precisely detecting the contact state of the holding claw in order to precisely operate the holding claw. In this case, it is conceivable to use a force sensor having a low frequency detection range for the purpose of performing precisely contact detection. However, in this case, when the holding claw strongly collides with the floor surface due to, for example, a malfunction, an excessive load is applied to the structure in the force sensor, and the force sensor may be damaged.

In response to this problem, in the robot hand 11 of the present embodiment, the claw member 73 constituting the tip of the holding claw 29 can be displaced in the length direction of the holding claw 29, and the controller 13 is the claw member 73. When the displacement amount is equal to or less than the threshold value, the controller 13 controls the operation of the holding claw 29 based on the detection value of the displacement sensor 75, and when the displacement amount of the claw member 73 exceeds the threshold value, the controller 13 controls the operation of the holding claw 29 based on the detection value of the force sensor 23.

In this way, when detecting the contact state of the holding claw 29, the displacement sensor 75 is in charge of the region where the load received by the claw member 73 is small and the displacement amount of the claw member 73 is small, and the force sensor 23 is in charge of the region where the load received by the claw member 73 is large and the displacement amount of the claw member 73 is large. Therefore, by using the displacement sensor 75 having a low detection range and the force sensor 23 having a high detection range in combination, precisely contact detection of the holding claw 29 can be performed without causing damage to the sensor. As a result, the precise movement of the holding claw 29 can be controlled with high accuracy. Further, the impact when the claw member 73 comes into contact with the object is alleviated by the displacement of the claw member 73. As a result, damage to the holding object P or the holding claw 29 can be suppressed. Further, by switching from the displacement sensor 75 to the force sensor 23 based on the displacement amount of the claw member 73, it is possible to obtain the effect of preventing the claw member 73 from interfering (contacting or colliding) with the holding object or a surrounding object.

In the robot hand 11 of the present embodiment, the reaction force applying part 74 includes the tension spring 87 that applies a first reaction force to the claw member 73 when the displacement amount of the claw member 73 is equal to or less than a threshold value, and the compression spring 88 that applies a second reaction force larger than the first reaction force to the claw member 73 when the displacement amount of the claw member 73 exceeds the threshold value.

According to this configuration, the reaction force applying part 74 applies a relatively small reaction force to the claw member 73 when the displacement amount of the claw member 73 is relatively small, and applies a relatively large reaction force to the claw member 73 when the displacement amount of the claw member 73 is relatively large. In this way, since the two types of springs are used properly in the reaction force applying part 74, an appropriate reaction force is applied according to the displacement amount of the claw member 73, and the precisely operation of the holding claw 29 can be enabled. In other words, the displacement of the smaller and thinner (smaller spring constant) tension spring 87 is measured by the displacement sensor 75, and when the displacement exceeds the threshold, the tension spring 87 is switched to the larger and thicker compression spring 88 (which has a larger spring constant), so as to switch to the measurement of the force sensor 23. The role of the compression spring 88 is to transmit a larger (exceeding the threshold value) force (load) caused by the displacement of the claw member 73 to the force sensor 23. Therefore, by providing a larger and thicker compression spring 88, the force (load) can be transmitted to the force sensor 23. In the robot hand 11 of the present embodiment, the orientations of the plurality of holding claws 29 can be changed.

For example, as shown in FIG. 1, it is assumed that the holding object P1 of the transport source S1 has a flat plate portion, and the flat plate portion is placed in an orientation facing the horizontal direction. In this case, it is difficult for the holding claw 29 to hold the holding object P only by moving the holding claw 29 up and down while keeping the orientation facing the vertical direction. In that case, in the present embodiment, the orientation of the holding claw 29 can be changed. Therefore, if the flat plate portion is scooped up in an orientation in which the holding claw 29 is tilted from the vertical direction, the holding claw 29 can hold the holding object P1. As described above, the robot hand 11 of the present embodiment can correspond to the holding object P randomly placed in various orientations.

In the robot hand 11 of the present embodiment, the claw member 73 includes an inner claw 79 arranged inside the holding claw 29 in the opening/closing direction and holding the holding object P, and an outer claw 80 arranged outside the opening/closing direction with respect to the inner claw 79.

According to this configuration, when the holding claw 29 is tilted from the vertical direction, the functions can be shared between the inner claw 79 that holds the holding object P and the outer claw 80 that is likely to come into contact with the floor surface before the inner claw 79. Thereby, the holding performance of the holding claw 29 can be improved.

Specifically, in the case of the present embodiment, the inner claw 79 is composed of a leaf spring that can be elastically deformed in the opening/closing direction of the holding claw 29.

According to this configuration, when the inner claw 79 holds the holding object P, the inner claw 79 elastically deforms in the direction of opening outward in the opening/closing direction. At this time, the inner claw 79 can stably hold the holding object P by the reaction force that tries to elastically return to the initial state.

Further, in the case of the present embodiment, the leaf spring constituting the inner claw 79 is warped in the direction in which the tip thereof faces inward in the opening/closing direction in the initial state.

According to this configuration, since the tip of the inner claw 79 is easily caught on the surface of the holding object P, the holding object P can be reliably held. In this case, since the inner claw 79 can precisely hold the holding object P like tweezers, it is suitable for holding a small and lightweight holding object P placed on the floor surface.

Further, as another method for precisely holding the holding object P, it is conceivable to attach an elastic body such as a rubber sheet to the inner surface of the holding claw. However, in that case, since the surface of the rubber sheet is sticky, when holding a holding object whose surface is made of vinyl, a small-sized holding object, or the like, a phenomenon may occur in which the holding object adheres to the surface of the rubber sheet and does not come off. On the other hand, in the present embodiment, the above phenomenon can be suppressed by using a leaf spring for the inner claw 79.

Further, in the case of the present embodiment, the inner claw 79 has a stopper 82, and the inner claw 79 is prevented from warping inward more than necessary in the initial state.

According to this configuration, the distance between the inner claw 79 and the outer claw 80 does not open more than necessary, and it is possible to prevent an object such as the holding object P from being caught in the gap between the inner claw 79 and the outer claw 80.

In the robot hand 11 of the present embodiment, the outer claw 80 includes a roller 84 that reduces friction with an object such as a floor surface or the holding object.

According to this configuration, the holding claw 29 is tilted from the vertical direction, and when the outer claw 80 comes into contact with an object such as the floor surface before the inner claw 79, the friction between the outer claw 80 and the object is reduced by the roller 84. As a result, the claw member 73 can be smoothly displaced with respect to the base member 71. Further, for example, when the friction between the outer claw 80 and the floor surface is large and the outer claw 80 is caught on the floor surface, there is a possibility that the holding claw 29 may malfunction due to erroneous detection of the contact state. On the other hand, according to the above configuration, the roller 84 reduces the friction between the outer claw 80 and the floor surface, and the outer claw 80 slides on the floor surface. As a result, there is little possibility that the holding claw 29 will malfunction, and the holding claw 29 can smoothly hold the holding object P.

Further, in the case of the present embodiment, the outer claw 80 is connected to the inner claw 79 so as to be displaceable in the length direction of the holding claw 29.

According to this configuration, the position of the tip of the outer claw 80 with respect to the tip of the inner claw 79 can be adjusted. Thereby, the friction reducing effect of the roller 84 can be appropriately adjusted.

The picking robot 10 of the present embodiment includes a robot hand 11 that exhibits the above effects.

According to this configuration, the picking robot 10 can hold various holding objects P placed in various orientations and situations in the box of the transport source S1 and efficiently transport them to the transport destination S2, for example.

The robot hand 11 of the above embodiment has a claw member 73 in which both of the two holding claws 29 are displaceable with respect to the base member 71. Instead of this configuration, of the two holding claws, only one holding claw may have a claw member displaceable with respect to the base member. For example, in the case of a robot hand used for an application in which the direction in which the holding claws are always tilted from the vertical direction is always determined, a plurality of holding claws may be arranged on the lower side when tilted from the vertical direction and only the holding claws in contact with the floor surface may be configured as described above. That is, the robot hand of the embodiment may have a claw member in which at least one of the plurality of holding claws is displaceable with respect to the base member.

The claw member may have a tapered structure that tapers toward the tip. According to this structure, when there are, for example, a plurality of cylindrical objects as the objects to be held, the claw member easily enters the gap between the adjacent cylindrical objects. More specifically, in the case of the claw member 73 of the above embodiment, the claw member 73 may have a tapered structure at least in one of the thickness direction (X-axis direction in the drawing) and the width direction (Y-axis direction in the drawing). In this case, this kind of tapered structure may be formed with respect to the inner claw 79, and it is desirable that the width of the outer claw 80 is narrowed so as not to exceed the width of the entire claw member 73 and the tip of the inner claw 79 in the Y direction, and it is not necessary to form a taper in particular.

Further, in the above embodiment, an example of a robot hand 11 that combines two holding functions of holding and suction, a so-called hybrid hand type robot hand, is given. Instead of this configuration, the present invention may be applied to, for example, a robot hand provided with only a holding unit.

According to at least one embodiment described above, the plurality of holding claws 29 that hold the holding object P, the holding claw opening/closing part 26 that opens and closes the plurality of holding claws 29, the force sensor 23 that detects the load received by the holding claw 29 when the holding claw 29 comes into contact with an object, and the controller 13 that controls the operation of the holding claw 29 are provided. At least one of the plurality of holding claws 29 includes the base member 71, the claw member 73 displaceably connected to the base member 71 in the length direction of the holding claw 29, the displacement sensor 75 that detects the amount of displacement of the claw member 73, and the reaction force applying part 74 that applies a reaction force to the claw member 73 to return the claw member 73 to the initial position when the claw member 73 is displaced from the initial position. The controller 13 performs control based on the detection value of the displacement sensor 75 when the displacement amount is equal to or less than the threshold value, and controls based on the detection value of the force sensor 23 when the displacement amount exceeds the threshold value. As a result, the risk of damage to the sensor can be reduced, and the robot hand 11 that enables the precisely operation of the holding claw 29 can be realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover the forms and modifications that fall within the scope and spirit of the inventions.

What is claimed is:

1. A holding device comprising:
   a plurality of holding parts configured to hold an object to be held;
   a holding part opening/closing part configured to open and close the plurality of holding parts;
   a first sensor configured to detect a load received by the holding part; and
   a controller configured to control an operation of the holding part,
   wherein at least one of the plurality of holding parts includes
     a claw member configured to be displaceable along a length direction of the holding part,
     a second sensor configured to detect a displacement amount of the claw member, and
     a reaction force applying part configured to apply a reaction force corresponding to the displacement amount of the claw member to the claw member, and
   the controller controls the operation of the holding part, based on a detection value of the second sensor when the displacement amount is equal to or less than a threshold value, and based on a detection value of the first sensor when the displacement amount exceeds the threshold value,
   wherein the reaction force applying part includes
     a first reaction force applying member configured to apply a first reaction force to the claw member when the displacement amount is equal to or less than the threshold value, and
     a second reaction force applying member configured to apply a second reaction force larger than the first reaction force to the claw member when the displacement amount exceeds the threshold value.

2. The holding device according to claim 1, wherein the holding parts are holding claws.

3. The holding device according to claim 1, wherein the plurality of holding parts are capable of changing their orientation.

4. The holding device according to claim 3, wherein the claw member includes
   an inner claw arranged inside of opening/closing direction of the plurality of holding parts and configured to hold the object to be held, and
   an outer claw arranged outside of the opening/closing direction with respect to the inner claw.

5. The holding device according to claim 4, wherein the inner claw is composed of a leaf spring that can be elastically deformed in the opening/closing direction.

6. The holding device according to claim 5, wherein the inner claw is curved in a direction in which a tip of the inner claw faces inward in the opening/closing direction in an initial state.

7. A holding device, comprising:
   a plurality of holding parts configured to hold an object to be held;
   a holding part opening/closing part configured to open and close the plurality of holding parts;
   a first sensor configured to detect a load received by the holding part; and
   a controller configured to control an operation of the holding part,
   wherein at least one of the plurality of holding parts includes
     a claw member configured to be displaceable along a length direction of the holding part,
     a second sensor configured to detect a displacement amount of the claw member, and
     a reaction force applying part configured to apply a reaction force corresponding to the displacement amount of the claw member to the claw member, and
   the controller controls the operation of the holding part, based on a detection value of the second sensor when the displacement amount is equal to or less than a threshold value, and based on a detection value of the first sensor when the displacement amount exceeds the threshold value,
   wherein the plurality of holding parts are capable of changing their orientation,
   wherein the claw member includes
     an inner claw arranged inside of opening/closing direction of the plurality of holding parts and configured to hold the object to be held, and
     an outer claw arranged outside of the opening/closing direction with respect to the inner claw, and
   wherein the outer claw includes a friction reducing member configured to reduce friction with an arbitrary object when contacting with the arbitrary object.

8. The holding device according to claim 7, wherein the outer claw is displaceably connected to the inner claw in a length direction of the holding part.

9. The holding device according to claim 7, wherein the friction reducing member is composed of rollers.

10. A transporting device comprising:
    the holding device according to claim 1; and
    an arm configured to be controlled by a controller and move the holding device.

11. A method for controlling a holding device, the holding device including
    a plurality of holding parts that holds an object to be held, the plurality of holding parts including a claw member configured to be displaceable along a length direction of the holding part,
    a first sensor that detects a load received by the holding part when the holding part comes into contact with the object, at least one of the plurality of holding parts being capable of expanded and contracted in a length direction of the holding part, and
    a second sensor configured to detect a displacement amount of a tip of the holding part,
    the method comprising:
    when the displacement amount of the tip of the holding part is equal to or less than a threshold value, controlling an operation of the holding part based on a detection value of the second sensor, and when the displacement amount exceeds the threshold value, controlling the operation of the holding part based on a detected value of the first sensor, applying a first reaction force to the claw member when the displacement amount is equal to or less than the threshold value, and applying a second reaction force larger than the first reaction force to the claw member when the displacement amount exceeds the threshold value.

12. The method according to claim 11, wherein the holding parts are holding claws.

13. A holding method for holding an object according to the method of claim 11.

14. A holding device comprising:
a plurality of holding parts configured to hold an object to be held;
a holding part opening/closing part configured to open and close the plurality of holding parts;
a first sensor configured to detect a load received by the holding part; and
a controller configured to control an operation of the holding part,
wherein at least one of the plurality of holding parts includes
a claw member configured to be displaceable along a length direction of the holding part,
a second sensor configured to detect a displacement amount of the claw member, and
a reaction force applying part configured to apply a reaction force corresponding to the displacement amount of the claw member to the claw member, and
the controller changes a control of the operation of the holding part according to the displacement amount of the claw member, based on a detection value of the second sensor when the displacement amount is equal to or less than a threshold value, and based on a detection value of the first sensor when the displacement amount exceeds the threshold value.

15. The holding device according to claim 14, wherein the reaction force applying part includes
a first reaction force applying member configured to apply a first reaction force to the claw member when the displacement amount is equal to or less than the threshold value, and
a second reaction force applying member configured to apply a second reaction force larger than the first reaction force to the claw member when the displacement amount exceeds the threshold value.

16. The holding device according to claim 14, wherein the plurality of holding parts are capable of changing their orientation.

17. The holding device according to claim 16, wherein the claw member includes
an inner claw arranged inside of opening/closing direction of the plurality of holding parts and configured to hold the object to be held, and
an outer claw arranged outside of the opening/closing direction with respect to the inner claw.

18. The holding device according to claim 17, wherein the inner claw is composed of a leaf spring that can be elastically deformed in the opening/closing direction.

19. The holding device according to claim 18, wherein the inner claw is curved in a direction in which a tip of the inner claw faces inward in the opening/closing direction in an initial state.

20. A transporting device comprising:
the holding device according to claim 14; and
an arm configured to be controlled by a controller and move the holding device.

* * * * *